United States Patent
Dreher et al.

(10) Patent No.: US 6,897,256 B1
(45) Date of Patent: May 24, 2005

(54) POLYMER DISPERSIONS

(75) Inventors: Stefan Dreher, Neustadt (DE); Bernd Reck, Grünstadt (DE); Michael Seufert, Bad Dürkheim (DE); Christian Pfaff, Neustadt (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/868,903
(22) PCT Filed: Jan. 7, 2000
(86) PCT No.: PCT/EP00/00091

§ 371 (c)(1),
(2), (4) Date: Jul. 9, 2001

(87) PCT Pub. No.: WO00/40627
PCT Pub. Date: Jul. 13, 2000

(30) Foreign Application Priority Data

Jan. 8, 1999 (DE) ........................ 199 00 460

(51) Int. Cl.⁷ ................................ C08K 3/20
(52) U.S. Cl. ............... 524/457; 524/458; 524/461
(58) Field of Search ................ 524/457, 458, 524/461, 460

(56) References Cited

U.S. PATENT DOCUMENTS

| | | | |
|---|---|---|---|
| 4,397,968 A | 8/1983 | Eck et al. | |
| 4,587,278 A | 5/1986 | Dotzauer et al. | |
| 5,874,524 A | 2/1999 | Pakusch et al. | |
| 6,051,640 A | 4/2000 | Reck et al. | |
| 6,730,740 B1 | 5/2004 | Mestach et al. | |

FOREIGN PATENT DOCUMENTS

| | | |
|---|---|---|
| DE | 31 11 602 | 10/1982 |
| EP | 123 234 | 10/1984 |
| EP | 735 061 | 10/1996 |
| EP | 0 770 640 A2 | 5/1997 |
| EP | 0 989 163 A1 | 3/2000 |
| WO | WO 92/00335 | 1/1992 |
| WO | WO 94/05896 | 3/1994 |
| WO | WO 97/15616 | 5/1997 |
| WO | WO 97/15617 | 5/1997 |

OTHER PUBLICATIONS

R. J. Hunter, Academic Press, 5 pages, "The Zeta Potential in Colloidal Science," 1981 (Table of Contents only).
D. H. Napper, Academic Press, pp. vii–xvi, "Polymeric Stabilization of Colloidal Dispersions," 1983 (Table of Contents only).

*Primary Examiner*—Edward J. Cain
(74) *Attorney, Agent, or Firm*—Oblon, Spivak, McClelland, Maier & Neustadt, P.C.

(57) ABSTRACT

A description is given of a polymer dispersion comprising i) polymer particles dispersed in an aqueous medium and composed of units of ethylenically unsaturated monomers, ii) a water-soluble polymeric polyelectrolyte which along a polymeric backbone carries a large number of ionic groups of uniform charge character or groups which can be ionized to such groups, and iii) an ionic surfactant which carries an ionic group having a charge character opposite to that of the polymeric polyelectrolyte, or a group which can be ionized to such a group. The polymer dispersion can be coagulated by simple dilution with water.

26 Claims, No Drawings

POLYMER DISPERSIONS

The present invention relates to a polymer dispersion comprising polymer particles dispersed in an aqueous medium and composed of units of ethylenically unsaturated monomers, to a process for preparing it and to its use as a binder for various purposes.

Polymer dispersions are stabilized in general by using ionic surfactants (see R. J. Hunter "The zeta potential in colloidal science", Academic Press (1981) London). Examples of suitable compounds for this purpose are alkyl sulfates, alkylsulfonates and alkylphosphonates and alkylarylsulfonates. The ethoxylated derivatives of these classes of substance are likewise frequently used. In addition to surfactants, water-soluble polymers, known as protective colloids, are also used as stabilizers for polymer dispersions (see D. H. Napper "Polymeric stabilization of colloidal dispersions", Academic Press (1983) London). WO-92/00335 describes the use of polyvinyl alcohol for stabilizing (meth)acrylate copolymer dispersions, using 1–5% by weight of protective colloid based on the monomer amount. To increase the stability of the latex, small amounts of ionic or nonionic surfactants are added to the polyvinyl alcohol-stabilized dispersions. DE-A-3111602 describes styrene acrylate copolymer dispersions, likewise including polyvinyl alcohol as protective colloid.

Polymer dispersions stabilized using surfactants or protective colloids display a characteristic stability behavior. On dilution with water, they retain their colloidal character, whereas the action of strong shear forces or high temperatures generally leads to coagulation. Latices stabilized with ionic surfactants, moreover, are unstable at high ionic strengths, e.g., following the addition of concentrated electrolyte solutions. For a range of processes, however, the desire is for polymer dispersions which exhibit a different stability behavior. For instance, in the binding of fibrous materials, such as fibers of wood, glass, textile or natural materials, an advantageous latex would be one which can be precipitated by simple dilution with water but at the same time shows a high level of stability to shear and to electrolyte. When the conventional polymer dispersions described above are used to bind such materials, it is generally necessary to use precipitants. EP-A-123234 describes the use of anionically stabilized styrene latices for binding mineral fiber moldings, using aluminum sulfate solutions, for example, as precipitants. EP-A-735061 describes cationically stabilized polymer dispersions which when borax solution is used as precipitant can be employed to bind fibrous materials.

It is an object of the present invention to provide a polymer dispersion which can be coagulated by simple dilution with water and at the same time shows a high level of stability to shear and electrolyte.

We have found that this object is achieved by means of a polymer dispersion which comprises polymer particles dispersed in an aqueous medium and composed of units of ethylenically unsaturated monomers, a water-soluble polymeric polyelectrolyte, which along a polymeric backbone carries a large number of ionic groups of uniform charge character or groups which can be ionized to such groups, and an ionic surfactant which carries an ionic group whose charge character is opposite to that of the polymeric polyelectrolyte, or a group which can be ionized to such a group.

"Ionic groups of uniform charge character" are groups which carry either one or more negative charges or one or more positive charges, each molecule of the polyelectrolyte containing only groups of one charge type. "Groups which can be ionized to ionic groups" are uncharged groups which in aqueous solution can be converted to ionic groups easily, e.g., by protonation or deprotonation. In the text below the term anionic polyelectrolyte refers to a polymeric compound which carries negatively charged groups and/or groups which can be ionized to negatively charged groups. A cationic polyelectrolyte is a polymeric compound which carries positively charged groups and/or groups which can be ionized to positively charged groups. Similarly, cationic surfactant is a surface-active molecule which carries a positively charged group or a group which can be ionized to such a group.

In the compositions of the invention, accordingly, either anionic polyelectrolytes are present in conjunction with cationic surfactants or cationic polyelectrolytes are present in conjunction with anionic surfactants. The compositions of the invention may additionally include nonionic surfactants in an amount, for example, of 1–50% by weight, preferably less than 30% by weight, based on the ionic surfactant.

The compositions of the invention are obtainable by free-radical polymerization of at least one ethylenically unsaturated monomer in the presence of the water-soluble polymeric electrolyte and the ionic surfactant. Accordingly, the invention also relates to a process for preparing a polymer dispersion, comprising the free-radical polymerization in an aqueous medium of at least one ethylenically unsaturated monomer in the presence of a combination of a polymeric polyelectrolyte which along a polymeric backbone carries a large number of ionic groups of uniform charge character or groups which can be ionized to such groups, and an ionic surfactant which carries an ionic group whose charge character is opposite to that of the polymeric polyelectrolyte or a group which can be ionized to such a group.

It is advantageous for the polymerization of the ethylenically unsaturated monomer to take place in the presence both of the polymeric polyelectrolyte and of the oppositely charged surfactant. If only the polyelectrolyte or the ionic surfactant is included in the initial polymerization charge, and an oppositely charged surfactant or polyelectrolyte, respectively, is added after the end of the polymerization, the result may be coagulation of the polymer dispersion.

The mixture of polyelectrolyte and oppositely charged surfactant must be soluble in the aqueous medium and should not form water-insoluble constituents, such as coacervates. It is preferred for the polyelectrolyte to have a number-average degree of polymerization of less than 2000, in particular less than 1000. The lower limit of the degree of polymerization of the polyelectrolyte is generally 10, preferably 20.

The polyelectrolyte used in accordance with the invention has either an anionic or cationic charge character. Preferred anionic polyelectrolytes are those polymers which are composed of units of ethylenically unsaturated monomers and which contain 20–100% by weight, preferably from 50 to 100 and, with particular preference, from 80 to 100% by weight, based on the total monomer units, of one or more monomers selected from ethylenically unsaturated $C_3$–$C_{10}$ monocarboxylic acids, their alkali metal salts and/or ammonium salts, e.g. acrylic acid, methacrylic acid, dimethylacrylic acid, ethylacrylic acid, allylacetic acid or vinylacetic acid;

ethylenically unsaturated $C_4$–$C_8$ dicarboxylic acids, their monoesters, anhydrides, alkali metal salts and/or ammonium salts, e.g. maleic acid, fumaric acid, itaconic acid, mesaconic acid, methylenemalonic acid, citraconic acid. Anionic polyelectrolytes can also be obtained starting from ethylenically unsaturated mono- and dicarboxylic anhydrides, alone or in a mixture with the abovementioned carboxylic acids. Under the polymerization conditions, in the aqueous medium, for example, in the case of solution or emulsion polymerization, or following the polymerization by reaction with an acid or base, the anhydride functions are converted to carboxyl groups. Ethylenically unsaturated carboxylic anhydrides which can be used are, in particular, maleic anhydride, itaconic anhydride and methylmalonic anhydride;

ethylenically unsaturated sulfonic acids, e.g., allylsulfonic acid, styrenesulfonic acid, 2-acrylamido-2-methylpropanesulfonic acid, methallylsulfonic acid, vinylsulfonic acid, 3-sulfopropyl acrylate or 3-sulfopropyl methacrylate;

ethylenically unsaturated sulfuric monoesters such as vinyl sulfate;

ethylenically unsaturated phosphonic acids, e.g., vinylphosphonic acid, allylphosphonic acid or acrylamidomethylpropanephosphonic acid.

Up to 80% by weight, preferably up to 50% by weight and, with particular preference, up to 20% by weight of the monomer units of the polyelectrolyte can consist of one or more nonionic and/or nonionizable monomers selected from $C_1$–$C_{20}$ alkyl or hydroxyalkyl esters of ethylenically unsaturated $C_3$–$C_{10}$ monocarboxylic or $C_4$–$C_8$ dicarboxylic acids, examples being methyl acrylate, ethyl acrylate, n-butyl acrylate, methyl methacrylate, stearyl acrylate, diethyl maleate, hydroxyethyl acrylate, hydroxypropyl acrylate, and hydroxyethyl methacrylate; (meth)acrylic esters of alkoxylated $C_1$–$C_{18}$ alcohols reacted with 2–50 mol of ethylene oxide, propylene oxide, butylene oxide or mixtures thereof; amides, and N-substituted amides of monoethylenically unsaturated $C_3$–$C_{10}$monocarboxylic or $C_4$–$C_8$ dicarboxylic acids, examples being acrylamide and methacrylamide, N-alkylacrylamides or N,N-dialkylacrylamides having 1–18 carbon atoms in the (each) alkyl group, such as N-methylacrylamide, N,N-dimethylacrylamide, maleic acid monomethylhexyl amide or acrylamidoglycolic acid; acrylonitrile and methacrylonitrile; vinyl esters, e.g., vinyl formate, vinyl acetate, vinyl propionate, which may also be present in fully or partly hydrolyzed form; N-vinyl compounds, e.g., N-vinylpyrrolidone, N-vinylcaprolactam, N-vinylformamide, N-vinyl-N-methylformamide, 1-vinylimidazole or 1-vinyl-2-methylimidazole; vinyl ethers of alkoxylated $C_1$–$C_{18}$ alcohols, and vinyl ethers of polyalkylene oxides such as polyethylene oxide, polypropylene oxide or polybutylene oxide; linear, branched or cyclic olefins and diolefins, e.g. ethene, propene, butene, butadiene, 1-pentene, cyclopentene, 1-hexene, 1-heptene, styrene or its derivatives, such as a-methylstyrene, indene, dicyclopentadiene or higher olefins which carry reactive double bonds, such as oligopropene and polyisobutene.

The anionic polyelectrolytes can be used in the acid form or in partly or fully neutralized form. Suitable neutralizing agents are bases, such as alkali metal or alkaline earth metal hydroxides, such as NaOH or KOH, ammonia, higher aliphatic and aromatic amines, and alkanolamines.

Also suitable as anionic polyelectrolytes are anionically modified polysaccharides, such as carboxymethylcellulose or dextran sulfate and/or salts thereof. Anionic polyelectrolytes particularly suitable for use are copolymers of maleic acid and acrylic acid.

Among the cationic polyelectrolytes preference is given to those polymers which are composed of units of ethylenically unsaturated monomers and 20–100% by weight, preferably from 50 to 100% by weight and, with particular preference, from 80 to 100% by weight, based on the total monomer units, of units of one or more monomers selected from ethylenically unsaturated monomers which carry quaternary ammonium groups or protonizable amino groups. By quaternary ammonium groups are meant ammonium ions whose nitrogen atom carries four radicals other than H. Protonizable amino groups are protonizable or quaternizable amines having from 1 to 3 non-H radicals on the nitrogen atom.

Ethylenically unsaturated monomers which carry quaternary ammonium groups can be obtained by reacting the corresponding amino-containing monomers with quaternizing agents. Suitable quaternizing agents are customary alkylating agents, e.g., dimethyl sulfate, diethyl sulfate, methyl chloride, ethyl chloride or benzyl chloride. Examples of ethylenically unsaturated monomers having protonizable amino groups are $C_2$–$C_6$ aminoalkyl (meth)acrylates or vinyl- or allyl-substituted nitrogen-containing heteroaromatics. Examples that may be recited include dimethylaminoethyl acrylate hydrochloride, diallyldimethylammonium chloride, dimethylaminoethyl acrylate methosulfate, dimethylaminopropylmethacrylamide methochloride, dimethylaminopropylmethacrylamide methosulfate, vinylpyridinium salts, and 1-vinylimidazolium salts.

Up to 80% by weight, preferably up to 50% by weight and, with particular preference, up to 20% by weight of the monomer units of the cationic polyelectrolyte in this case can consist of the abovementioned nonionic or nonionizable monomers. Insofar as they carry protonizable amino groups, the cationic polyelectrolytes can be used in base form or in partly or fully protonated form. Examples of suitable protonizing agents are mineral acids, such as hydrochloric acid, sulfuric acid or nitric acid.

The polyelectrolytes are judiciously prepared by free-radically initiated polymerization, especially solution polymerization. The implementation of the polymerization, and auxiliaries, are described below in connection with the preparation of the dispersed polymer particles.

The composition of the invention further includes a surfactant which carries a charge opposite to that of the polyelectrolyte. Examples of suitable anionic surfactants are alkyl sulfates, such as the fatty alcohol sulfates;
sulfuric monoesters with ethoxylated alkyl alcohols, such as the fatty alcohol polyglycol ether sulfates;
sulfuric monoesters with ethoxylated $C_4$–$C_9$ alkylphenols;
alkylsulfonates, such as paraffinsulfonates;
alkenylsulfonates;
alkylarylsulfonates, such as alkylbenzenesulfonates;
alkylglyceryl ether sulfonates;
alkyl phosphates and dialkyl phosphates;
alkylaryl phosphates;
alkyl-, alkenyl- or alkylarylphosphonates;
mono- and dialkyl esters of sulfosuccinic acid;
singly or multiply ring-sulfonated monoalkylbiphenyl ethers;
methylcarboxylates of ethoxylated alkyl alcohols, such as the fatty alcohol polyglycol ether methylcarboxylates; and $C_6$–$C_{22}$ carboxylic acids.

In the above list, alkyl and alkenyl, unless specified otherwise, are $C_6$–$C_{22}$, preferably $C_{12}$–$C_{18}$ alkyl and alkenyl, respectively. Where ethoxylated compounds are listed, the degree of ethoxylation is from 1 to 100, preferably from 2 to 50 EO units.

Preferred anionic surfactants are ethoxylated alkyl sulfates or alkylsulfonates and also ethoxylated alkylaryl sulfates or alkylarylsulfonates.

The anionic surfactants can be present in the form of the alkali metal salts, preferably the sodium or potassium salt, or in the form of ammonium salts, or else as soluble salts of organic bases, such as mono-, di- or triethanolamines or other substituted amines, such as triethylamine, pyridine, piperidine or morpholine.

Cationic surfactants which can be used are those which contain quaternary ammonium groups or protonizable amino groups. Preferred cationic surfactants are quaternary ammonium salts or amines and/or their protonated forms, each of which comprises at least one hydrocarbon chain of at least 6 carbon atoms. The hydrocarbon chain can have, for example, up to 40 carbon atoms. It can be saturated or else mono- or polyunsaturated.

Ammonium salts of the formula

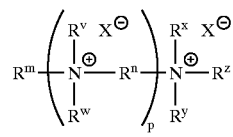

are preferred in which $R^m$ is $C_6$–$C_{22}$ alkyl, $C_6$–$C_{22}$ alkenyl, aryl($C_6$–$C_{22}$ alkyl) or aryl($C_6$–$C_{22}$ alkenyl), the alkenyl radical having from 1 to 3 double bonds, $R^v$, $R^w$, $R^x$, $R^y$ and $R^z$, which can be identical or different, are —(CHRCH$_2$—O—)$_n$H, where R is H or CH$_3$ and n is from 1 to 25, or are $C_1$–$C_4$ alkyl or $C_5$–$C_7$ cycloalkyl which is unsubstituted or substituted by one or more hydroxyl groups, or are as defined for $R^m$, or $R^x$ and $R^y$, together with the nitrogen atom to which they are attached, form a saturated 5- to 8-membered ring with or without further heteroatoms selected from O, N and S, or $R^x$, $R^y$ and $R^z$, together with the nitrogen atom to which they are attached, are a 5- to 8-membered aromatic ring;

$R^n$ is $C_1$–$C_4$ alkylene, preferably propylene;

x is an anion, e.g., a halide, such as Cl$^-$ or Br$^-$, or sulfate, nitrate; methylsulfate, ethylsulfate; and p can take on the value 0 or 1.

Aryl is preferably phenyl.

Suitable examples are $C_8$–$C_{18}$ alkyltrimethylammonium chlorides or bromides, ditallowdimethylammonium chloride and laurylbenzyldimethylammonium chloride. Further examples are cationic surfactants containing piperidinium groups and cationic surfactants containing pyridinium, imidazolinium, oxazolinium or pyrimidine groups, e.g., N-laurylpyridinium chloride.

Preference is also given to amines of the formula

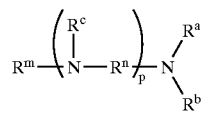

in which $R^m$ is as defined above, $R^a$, $R^b$ and $R^c$, which can be identical or different, are H, —(CHRCH$_2$—O—)$_n$H, where R is H or CH$_3$ and n is from 1 to 25, or are $C_1$–$C_4$ alkyl or $C_5$–$C_7$ cycloalkyl which is unsubstituted or substituted by one or more hydroxyl groups, or are as defined for $R^m$, or $R^a$ and $R^b$, together with the nitrogen atom to which they are attached, form a saturated 5- to 8-membered ring with or without further heteroatoms selected from O, N and S, $R^n$ is $C_1$–$C_4$ alkylene, preferably propylene; and p can take on the value 0 or 1.

These amines include natural $C_8$–$C_{18}$ mono- or dialkylamines, examples being mono- or dioleylamines, mono- or di-, coco- or tallow-amines, or synthetic $C_8$–$C_{18}$ mono- or dialkylamines. Likewise suitable are ethoxylated or propoxylated derivatives of these compounds. Examples of such substances are commercial products sold under the names NORAMOX and DINORAMOX (by ELF-ATOCHEM) and also LUTENSOL FA (by BASF AG). The amines can be protonated using mineral acids, such as hydrochloric acid, sulfuric acid, or nitric acid, strong organic acids, such as chloroacetic acid, or polymeric acids, e.g., polyacrylic acid or copolymers thereof.

The compositions of the invention may optionally include a nonionic surfactant as well. Suitable representatives of this class are, for example, polyalkylene oxide adducts, such as ethylene oxide-propylene oxide block copolymers, fatty acid esters of polyhydroxy compounds, e.g., sorbitan alkyl esters, glycerol alkyl esters, fatty acid alkylolamido ethoxylates, and also adducts of 3–40 mol, preferably 4–20 mol, of ethylene oxide with fatty alcohols, alkylphenols, fatty acids, fatty amines, fatty acid amides, or alkanesulfonamides. Also suitable are nonionic surfactants of the amine oxide or sulfoxide type.

Particularly stable polymer dispersions are obtained if the ionic surfactant and—if present—the nonionic surfactant are ethoxylated surfactants. The degree of ethoxylation is preferably from 2 to 50. Specific preference is given to ethoxylated alkyl-, alkenyl- or alkylarylsulfonates and alkyl, alkenyl or alkylaryl sulfates, and also to ethoxylated $C_8$–$C_{18}$ mono- or dialkylamines.

The compositions of the invention comprise polymer particles which are dispersed in an aqueous medium and are composed of units of ethylenically unsaturated monomers. They can be prepared using all free-radically polymerizable monomers. In general, the polymer is composed of 60–100% by weight, preferably 80–100% by weight, based on the total weight of the monomers, of an ethylenically unsaturated monomer without functional groups (principal monomer) and 0–40% by weight, preferably 0–20% by weight, of at least one monomer which has functional groups (comonomer).

The principal monomer is preferably selected from esters of preferably $C_3$–$C_6$, α, β-monoethylenically unsaturated mono- or dicarboxylic acids, such as acrylic acid, maleic acid, fumaric acid and itaconic acid, with $C_1$–$C_{12}$, preferably $C_1$–$C_8$ and, in particular, $C_1$–$C_5$ alkanols. Esters of this kind are, in particular, methyl, ethyl, n-butyl, isobutyl, tert-butyl, n-pentyl, isopentyl and 2-ethylhexyl acrylate and methacrylate; vinylaromatic compounds such as styrene, α-methylstyrene, o-chlorostyrene or vinyltoluenes; vinyl esters of $C_1$–$C_{18}$ mono- or dicarboxylic acids, such as vinyl acetate, vinyl propionate, vinyl n-butyrate, vinyl laurate and vinyl stearate; butadiene, propene and ethene.

Particularly preferred principal monomers are styrene, methyl methacrylate, n-butyl acrylate, ethyl acrylate, 2-ethylhexyl acrylate, butadiene, and vinyl acetate.

Particularly suitable comonomers are α,β-unsaturated mono- or dicarboxylic acids and their salts or anhydrides such as, for example, acrylic acid, methacrylic acid, maleic acid, maleic anhydride, and itaconic acid; linear 1-olefins, branched-chain 1-olefins or cyclic olefins, such as, for example, butene, isobutene, pentene, cyclopentene, hexene or cyclohexene. Also suitable are oligoolefins prepared with metallocene catalysis and possessing a terminal double bond, such as oligopropene or oligohexene; acrylonitrile, methacrylonitrile; vinyl and allyl alkyl ethers with 1–40 carbon atoms in the alkyl radical, it being possible for said alkyl radical to carry further substituents such as a hydroxyl group, an amino or diamino group, or one or more alkoxylate groups, examples being methyl vinyl ether, ethyl vinyl ether, propyl vinyl ether and 2-ethylhexyl vinyl ether; acrylamides and alkyl-substituted acrylamides, such as acrylamide, methacrylamide, N,N-dimethylacrylamide and N-methylolmethacrylamide; monomers containing sulfo groups, such as allylsulfonic acid, styrenesulfonic acid, vinylsulfonic acid, 2-acrylamido-2-methylpropanesulfonic acid or their corresponding alkali metal or ammonium salts; $C_1$–$C_4$ hydroxyalkyl esters of $C_3$–$C_6$ mono- or dicarboxylic acids (see above), especially of acrylic acid, methacrylic acid or maleic acid, or their derivatives alkoxylated with 2–50 mol of ethylene oxide, propylene oxide, butylene oxide or mixtures thereof, or esters of $C_1$–$C_{18}$ alcohols, alkoxylated with 2–50 mol of ethylene oxide, propylene oxide, butylene oxide or mixtures thereof, with the abovementioned acids, such as, for example, hydroxyethyl acrylate, hydroxyethyl methacrylate, hydroxypropyl acrylate or methylpolyglycol methacrylate; vinylphosphonic acid, dimethyl vinylphosphonate and other phosphorus-containing monomers; alkylaminoalkyl (meth)acrylates or alkylamino (meth)acrylamides or their quaternization products, such as, for example, 2-(N,N-dimethylamino)ethyl methacrylate or 2-(N,N,N-trimethylammonium)ethyl methacrylate chloride; allyl esters of $C_1$–$C_{30}$ monocarboxylic acids; N-vinyl compounds such as N-vinylformamide, N-vinylpyrrolidone, N-vinylimidazole, N-vinylcarbazole or N-vinylcaprolactam; diallyldimethylammonium chloride, vinylidene chloride, vinyl chloride, acrolein, methacrolein; monomers containing 1,3-diketo groups, such as acetoacetoxyethyl (meth)acrylate or diacetoneacrylamide, monomers containing urea groups, such as ureidoethyl (meth)acrylate, acrylamidoglycolic acid, methacrylamidoglycolate methyl ether; monomers containing silyl groups, such as trimethoxysilylpropyl methacrylate, for example; and glycidyl-containing monomers, such as glycidyl methacrylate, for example.

Particularly preferred comonomers are acrylic acid, methacrylic acid, acrylonitrile, acrylamide, hydroxyethyl acrylate, hydroxyethyl methacrylate and glycidyl methacrylate.

The polyelectrolytes and the ionic surfactant are used preferably in a solids-based weight ratio of from 20:1 to 1:1, in particular from 10:1 to 2:1. The number-average degree of polymerization of the polyelectrolyte is preferably <2000, in particular <1000. It is generally greater than 10. The weight ratio of polyelectrolyte to polymer particles is preferably from 5:1 to 1:10, in particular from 1:1 to 1:3. If a nonionic surfactant is used as well, it is used preferably in an amount of 1–50% by weight based on the ionic surfactant, in particular less than 30% by weight.

Based on the overall weight of the polymer dispersion, the latter generally contains from about 5 to 40% by weight of polyelectrolyte and from 2.5 to 15% by weight of ionic surfactant.

The polymer dispersion of the invention is prepared preferably by aqueous emulsion polymerization, with the option of a batchwise, semicontinuous or continuous procedure. It has proven advantageous to include at least some, in particular substantially all, of the ionic surfactant and the polymeric polyelectrolyte in the initial charge and to add the monomers for preparing the polymer particles as they are or in dissolved or emulsified form. Addition preferably takes place in the form of a monomer emulsion, which is stabilized by a portion of the ionic surfactant, e.g. 5–50% by weight of the total amount, or by the optionally present nonionic surfactant.

The polymerization is preferably conducted in the presence of compounds which form free radicals (initiators). 0.05–10, with particular preference 0.2–5, % by weight of these compounds is required, based on the monomers used in the polymerization.

Examples of suitable polymerization initiators are peroxides, hydroperoxides, peroxodisulfates, percarbonates, peroxo esters, hydrogen peroxide, and azo compounds. Examples of initiators, which may be either soluble or insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiisobutyronitrile, 2,2'-azobis(2-amidinopropane)dihydrochloride, 2-(carbamoylazo)isobutyronitrile, and 4,4-azobis(4-cyanovaleric acid). The known redox initiator systems as well, such as, for example, $H_2O_2$/ascorbic acid or t-butyl hydroperoxide/sodium hydroxymethanesulfinate, can be used as polymerization initiators.

The initiators can be employed alone or in a mixture with one another, examples being mixtures of hydrogen peroxide and sodium peroxodisulfate. For polymerization in an aqueous medium it is preferred to use water-soluble initiators.

In order to prepare polymers having a low average molecular weight it is often judicious to conduct the copolymerization in the presence of regulators. Customary regulators can be used for this purpose, examples being organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, hydroxylammonium salts such as hydroxylammonium sulfate, formic acid, sodium bisulfite, and isopropanol. The polymerization regulators are generally used in amounts of 0.05–5% by weight, based on the monomers.

In order to prepare copolymers of relatively high molecular mass it is often judicious to operate in the presence of crosslinkers during the polymerization. Such crosslinkers are compounds having two or more ethylenically unsaturated groups, such as, for example, diacrylates or dimethacrylates of at least dihydric saturated alcohols, e.g., ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than two OH groups can also be used as crosslinkers, an example being trimethylolpropane triacrylate or trimethylolpropane trimethacrylate. Another class of crosslinkers are diacrylates or dimethacrylates of polyethylene glycols or polypropylene glycols having molecular weights of in each case 200–9000.

In addition to the homopolymers of ethylene oxide or propylene oxide it is also possible to use block copolymers of ethylene oxide and propylene oxide, or ethylene oxide-propylene oxide copolymers in which the ethylene oxide and propylene oxide units are distributed randomly. The oligomers of ethylene oxide and/or propylene oxide are also suitable for preparing crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers are vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth) acrylamide, divinylethyleneurea, divinylpropyleneurea, divinylbenzene, divinyldioxane, triallyl cyanurate, tetraallylsilane, tetravinylsilane and bis- or polyacryloyl siloxanes (e.g., Tegomers® from Th. Goldschmidt AG). The crosslinkers are used preferably in amounts of from 10 ppm to 5% by weight, based on the monomers to be polymerized.

The polymer dispersion is generally prepared in water as the dispersing medium. However, it is also possible for water-miscible organic solvents to be present, such as alcohols and ketones, examples being methanol, ethanol, n-propanol, isopropanol, n-butanol, acetone, or methyl ethyl ketone, in a proportion of up to about 30% by volume. The result is a stable, finely particulate polymer dispersion. The particle sizes can be determined by methods customary for aqueous emulsion polymers. For example, the particle sizes determined by means of quasielastic light scattering are generally within the range 30–1500 nm, preferably 40–500 nm. The particle size distribution can be monomodal or polymodal.

The dispersed polymer particles generally have a weight-average molecular weight of from 1000 to 5,000,000, preferably from 5000 to 2,000,000.

The compositions of the invention generally have a level of nonvolatile fractions (solids content) which is in the range 20–70% by weight, especially 25–55% by weight. The viscosity of the composition of the invention (at a solids content of 40% by weight) lies within the range 10–3000 mPas, measured using a rotational viscometer in accordance with DIN 53019 at 23° C. and a shear rate of 250 s$^{-1}$. Preference is given to viscosities of 20–2000 mPas, especially 20–1000 mPas.

The polymer dispersions of the invention feature a high level of stability to shear and to electrolyte. The dispersed polymer particles can generally be precipitated (coagulated) by simple dilution of the polymer dispersion with aqueous medium, such as water. The aqueous medium preferably contains no customary precipitants, such as polyvalent metal ions, e.g. $Al^{3+}$. To precipitate the polymer particles the polymer dispersion is generally diluted with from 2 to 10 times the volume of aqueous medium.

On drying at room temperature or elevated temperature, the polymer dispersions of the invention give a coherent film which possesses high mechanical strength and high water resistance. By subsequent thermal conditioning of the films at temperatures of more than 60° C., preferably more than 120° C., it is generally possible to bring about a distinct increase in the hardness and strength of the material. This increase in hardness can be registered, for example, by measuring the König pendulum hardness in accordance with DIN 53157.

The polymer dispersions of the invention are suitable as binders especially for moldings, sheetlike textile structures, and adhesives, or for coating purposes. They are particularly suitable as heat-curable laminating adhesives. When the polymer dispersions are formulated as binders for various purposes, they may include further customary auxiliaries.

Where the polymer particles include units of monomers having crosslinkable side groups, the compositions of the invention may comprise a reaction accelerant (catalyst), although preferably they are devoid of such a reaction accelerant. Examples of suitable reaction accelerants are alkali metal hypophosphites, phosphites, polyphosphates, and dihydrogen phosphates, polyphosphoric acid, hypophosphoric acid, phosphoric acid, alkylphosphinic acid, or oligomers or polymers of these salts and acids.

Further suitable catalysts are strong acids, such as sulfuric acid or p-toluenesulfonic acid, for example. In addition, polymeric sulfonic acids, such as poly(acrylamido-2-methylpropanesulfonic acid), poly(vinylsulfonic acid), poly(p-styrenesulfonic acid), poly(sulfopropyl methacrylate), and polymeric phosphonic acids, such as poly(vinylphosphonic acid), for example, and also copolymers derived therefrom with the comonomers described above, are suitable.

Further suitable catalysts are organotitanates and organozirconates such as, for example, triethanol titanate, titanium chelate ETAM and tetrabutyl zirconate, which are sold for example, by Hüls.

The compositions according to the invention may also include customary additives depending on the intended application. For example, they may include bactericides or fungicides. In addition, they may include hydrophobicizing agents for increasing the water resistance of the treated substrates. Suitable hydrophobicizing agents are customary aqueous paraffin dispersions or silicones. In addition, the compositions may comprise wetting agents, thickeners, plasticizers, retention aids, pigments, and fillers.

Finally, the compositions of the invention may comprise customary flame retardants, such as aluminum silicates, aluminum hydroxides, borates and/or phosphates, for example.

In many cases the compositions also include coupling reagents, such as alkoxysilanes, examples being 3-aminopropyltriethoxy-silane, soluble or emulsifiable oils as lubricants and dust binders, and also wetting auxiliaries.

Furthermore, the compositions of the invention can include the auxiliaries customary in coating technology and impregnating technology. Examples of such auxiliaries are finely divided inert fillers, such as aluminum silicates, quartz, precipitated or pyrogenic silica, light spar and heavy spar, talc, dolomite or calcium carbonate; color pigments, such as titanium white, zinc white, iron oxide black, etc., foam inhibitors, such as modified dimethylpolysiloxanes, adhesion promoters, and preservatives.

The compositions of the invention can also be used in a blend with other binders, such as, for example, urea-formaldehyde resins, melamine-formaldehyde resins or phenol-formaldehyde resins, and with epoxy resins.

The invention additionally provides a method of producing two- or three-dimensional structures which involves contacting a particulate or fibriform substrate with a polymer dispersion and subjecting the substrate so treated to a curing step.

The invention particularly provides a method of producing two- or three-dimensional structures which involves contacting a polymer dispersion of the invention, a particulate or fibriform substrate and an aqueous phase with one another, in the course of which the polymer particles become coagulated, removing any excess aqueous phase, and subjecting the mixture of substrate and coagulated polymer particles to a curing step.

A particularly suitable aqueous phase is mains water. The contacting of dispersions, substrate and aqueous phase can take place, for example, by adding a polymer dispersion of the invention to an aqueous slurry or suspension of the substrate. Substrate slurries or suspensions of this kind are encountered in a variety of industrial processes, for example, cellulose fiber pulp in papermaking, or slurries of wood fibers in chipboard manufacture.

The removal of excess aqueous phase takes place, for example, by pressing, on a fourdrinier wire, for example, or on membrane presses, etc.

Alternatively, the substrate can be mixed first of all with a polymer dispersion of the invention, and aqueous phase can be added to the mixture.

The curing step is accomplished preferably by heating. On heating, the water present in the composition undergoes evaporation and the composition is cured. These processes can take place in succession or simultaneously. By curing is meant in this context the chemical alteration of the composition; for example, crosslinking through the linkage of covalent bonds between the various constituents of the compositions, formation of ionic interactions and clusters, and formation of hydrogen bonds. Curing may also be accompanied by physical changes within the binder, such as changes of phase or phase inversion, for example.

The curing temperatures are between 75 and 250° C., preferably between 90 and 200° C. and, with particular preference, between 100 and 180° C. The duration and temperature of heating influence the degree of curing. An advantage of the compositions of the invention is that they can be cured at comparatively low temperatures.

Curing can also be carried out in two or more stages. Thus, for example, in a first step the curing temperature and curing time can be chosen so that the degree of curing reached is low, and substantially complete curing takes place in a second step. This second step can take place at a different place and time than the first step. This enables, for example, the compositions of the invention to be used for producing binder-impregnated semifinished articles which can be shaped and cured at a different location.

Suitable particulate or fibriform substrates include fibers, slivers or chips. These may consist of renewable raw materials or of synthetic or natural fibers, such as those from rags, for example. As renewable raw materials mention may be made in particular of sisal, jute, flax, coconut fiber, kenaf, banana fiber, hemp, and cork. Wood fibers or wood chips are particularly preferred.

The moldings preferably have a density of 0.2–1.4 g/cm$^3$ at 23° C. Particularly suitable moldings are sheets and shaped parts having irregular contours. Their thickness is generally at least 1 mm, preferably at least 2 mm, and their surface area typically from 200 to 200,000 cm$^2$. Consideration may be given, in particular, to interior automotive parts, such as interior door trim, dashboards, and parcel shelves.

The amount by weight of the binder used is generally 0.5–50% by weight, preferably 1–40% by weight (in terms of binder solids), based on the substrate (fibers, slivers or chips).

The mixture of fibers, slivers and chips and the binder can be subjected to initial drying at temperatures of 10–150° C., for example, and then to compression molding to form the moldings, for example at temperatures of 50–250° C., preferably 100–240° C. and, with particular preference, 120–225° C. under pressures of generally 2–1000 bar, preferably 10–750 bar, and, with particular preference, 20–500 bar.

The binders are particularly suitable for producing woodbase materials such as wood chipboards and wood fiberboards (cf. Ullmanns Encyclopädie der technischen Chemie, 4$^{th}$ edition 1976, Volume 12, pp. 709–727), which can be produced by glueing disintegrated wood, such as wood chips and wood fibers, for example. The water resistance of woodbase materials can be enhanced by adding to the binder a customary commercial aqueous paraffin dispersion or other hydrophobicizing agents, or adding said hydrophobicizing agents beforehand or subsequently to the fibers, slivers or chips.

Chipboard production is widely known and described, for example, in H. J. Deppe, K. Ernst Taschenbuch der Spanplattentechnik, 2$^{nd}$ edition, Verlag Leinfelden 1982.

It is preferred to use chips whose average size is from 0.1 to 4 mm, in particular from 0.2 to 2 mm, and which contain less than 6% by weight of water. However, it is also possible to use considerably coarser chips and those with a higher moisture content. The binder is applied with great uniformity to the wood chips, the weight ratio of binder solids to wood chips preferably being from 0.02:1 to 0.3:1. Uniform distribution can be achieved, for example, by spraying the binder in finely divided form onto the chips.

The glued wood chips are then spread out to form a layer with a highly uniform surface, the thickness of the layer being guided by the desired thickness of the finished chipboard. The scattered layer is pressed at a temperature of 100–250° C., for example, preferably 120–225° C., by applying pressures of usually 10–750 bar, to form a board. The required press times may vary within a wide range and are generally from 15 seconds to 30 minutes.

Other natural fiber substances as well, such as sisal, jute, hemp, flax, coconut fiber, banana fiber and other natural fibers, can be processed with the binders to form sheets and shaped parts. The natural fiber materials can also be used in mixtures with plastic fibers, such as polypropylene, polyethylene, polyesters, polyamide or polyacrylonitrile. In this case the plastic fibers may also function as cobinders in addition to the binder of the invention. The proportion of plastic fibers in this case is preferably less than 50% by weight, in particular less than 30% by weight and, with very particular preference, less than 10% by weight, based on all chips, slivers or fibers. The fibers can be processed by the method used for the wood fiberboards. Alternatively, preformed natural fiber mats can be impregnated with the binders of the invention, with or without the addition of a wetting auxiliary. The impregnated mats, in the binder-moist or predried state, are then pressed at temperatures between 100–250° C. and pressures between 10–100 bar, for example, to form sheets or shaped parts.

The substrates impregnated with the binders of the invention preferably have a residual moisture content on pressing of 3–20% by weight, based on the substrate to be bound.

The moldings obtained in accordance with the invention feature low water absorption, little increase in thickness (swelling) after storage in water, and good strength, and are formaldehyde-free.

In addition, the polymer dispersions of the invention can be used to produce sandpaper and other abrasives by the production techniques customarily carried out with phenolic resin binders. In the production of sandpapers, a layer of binder is first of all applied (judiciously 10 g/m$^2$) as base binder to an appropriate backing paper. The desired amount of particulate abrasive is scattered into the wet base binder. After initial drying, a binder topcoat is applied (e.g. 5 g/m$^2$). The paper coated in this way is then cured by heating (for example, at 170° C. for 5 minutes).

The polymer dispersions of the invention are suitable, furthermore, as core sand binders for producing casting molds and cores for metal casting according to the conventional processes. They are suitable, in addition, as binders for mold insulating boards and mineral fiber insulating materials.

The compositions of the invention can additionally be used for coating purposes, for example, as binders for coating and impregnating compositions for sheets of organic and/or inorganic fibers, nonfibrous mineral fillers, and also starch and/or aqueous polymer dispersions. The coating and impregnating compositions give the sheets a high flexural modulus. The production of such sheets is known.

The components of the composition of the invention are present in the coating composition generally in an amount of 1–65% by weight. The proportion of inert fillers is generally 0–85% by weight, while that of water is at least 10% by weight.

The compositions are employed in a customary manner by application to a substrate, for example, by spraying, rolling, pouring or impregnating. The amounts applied, based on the dry-matter content of the composition, are generally 2–100 g/m$^2$.

The amounts of additives to be used are known to the skilled worker and are guided in each individual case by the desired properties and the intended application.

The compositions of the invention can also be used as binders for sheetlike textile structures. To produce the sheetlike textile structures, the binder is applied to an assembly of fibers, any excess is removed, and the binder is cured.

Examples of suitable fibers are webs of cellulose, cellulose acetate, esters and ethers of cellulose, cotton, hemp, animal fibers, such as wool or hair, and especially nonwovens of synthetic or inorganic fibers, examples being aramid, carbon, polyacrylonitrile, polyester, mineral, PVC, and glass fibers.

When used as binders for fiber webs the compositions of the invention may, for example, include the following additives: silicates, silicones, boron compounds, lubricants, wetting agents.

The binder is applied to the untreated fiber web by means, for example, of coating, impregnating or soaking in a weight ratio of fiber to binder (solids) of from 10:1 to 1:1, with particular reference from 6:1 to 3:1.

Application of the binder to the untreated fiber web is generally followed by drying at, preferably, 100–400° C., especially 130–280° C., and, with very particular preference, 130–230° C., over a period of preferably 10 seconds to 10 minutes, in particular from 10 seconds to 3 minutes.

The bonded fiber web obtained has high strength in the dry and wet states. In particular, the binders of the invention permit short drying times and also low drying temperatures.

The bonded fiber webs, especially glass fiber webs, are suitable for use as or in roofing membranes, as base materials for wallpapers, or as inliners or base material for floor coverings made, for example, from PVC.

For use as roofing membranes, the bonded fiber webs are generally coated with bitumen.

The compositions of the invention can be used to produce laminates, for decorative applications, for example, by impregnating paper and then carrying out gentle drying, in accordance with the known processes. These laminates are, in a second step, laminated onto the substrate to be coated, under pressure and with heat, the conditions being chosen such that curing of the binder takes place.

The Examples which follow are intended to illustrate the invention. The solids content was determined from the weight loss of a 1 g sample dried at 120° C. for 2 h in a circulating-air drying cabinet. The viscosity of the samples was determined with the aid of a rotational viscometer (Rheomat) from Paar Physica at a shear rate of 250 s$^{-1}$ at 23° C. in accordance with DIN 53109. The K value of the polyelectrolytes was measured in 1% strength aqueous solution in analogy to DIN 53726.

EXAMPLE 1

A 4 l glass vessel with anchor stirrer (120 rpm) was charged with 628 g of water, 682 g of a 44% strength by weight aqueous solution of a sodium acrylamidopropanesulfonate homopolymer (pH 4.4; K value 8.2), and 250 g of a 40% strength by weight aqueous solution of Lipamin OK (BASF, ethoxylated oleylmonoamine, average degree of ethoxylation=12; permanently quaternized with dimethyl sulfate). At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 4 h and the remainder of feed stream 2 was supplied continuously over the course of 4.5 h, the two feed streams being kept spatially separate. The polymer prepared in this way contains 39.2% of nonvolatile fractions and has a pH of 4.6. The viscosity of the resulting composition is 589 mPas.

Feed stream 1:

200 g of styrene 150 g of n-butyl methacrylate 150 g of ethyl acrylate

Feed stream 2:

100 g of deionized water 5 g of sodium peroxodisulfate

EXAMPLE 2

A 4 l glass vessel with anchor stirrer (120 rpm) was charged with 359 g of water, 300 g of a 32% strength by weight aqueous solution of a dimethylaminoethyl acrylate homopolymer (permanently quaternized with dimethyl sulfate; pH 4.0; K value 10.8), and 167 g of a 30% strength by weight aqueous solution of Disponil FES 77 (Henkel, fatty ether sulfate, average degree of ethoxylation=30). At an internal temperature of 85° C., 5% by weight of the total amount of a feed stream 1 and 10% by weight of the total amount of feed streams 2 and 3 were added. The reaction mixture was initially polymerized at 85° C. for 10 minutes. Thereafter, at 85° C., the remainder of feed streams 1,2 and 3 was supplied continuously over the course of 3 h, the three feed streams being kept spatially separate. The polymer prepared in this way contains 37.5% of nonvolatile fractions and has a pH of 3.7. The viscosity of the resulting composition is 854 mPas.

Feed stream 1:

350 g of n-butyl acrylate 125 g of methyl methacrylate 150 g of acrylonitrile 400 g of deionized water 33 g of Disponil FES 77

Feed stream 2:

10 g of tert-butyl hydroperoxide (10% strength aqueous solution)

Feed stream 3:

5 g of sodium bisulfite (20% strength aqueous solution)

40 g of deionized water

EXAMPLE 3

A 4 l glass vessel with anchor stirrer (120 rpm) was charged with 1200 g of Sokalan CP 12 C (50% strength by weight aqueous solution of an acrylic acid-maleic acid copolymer, average composition about 50:50 by weight AA:MA, pH about 1.8, average molar mass Mw=3000 g/mol) and 375 g of a 40% strength by weight aqueous solution of Uniperol AC (BASF, ethoxylated oleylmonoamine, average degree of ethoxylation=12). At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 3 h and the remainder of feed stream 2 was supplied continuously over the course of 3.5 h, the two feed streams being kept spatially separate. The polymer prepared in this way contains 63.7% of nonvolatile fractions and has a pH of 1.5. The viscosity of the resulting composition is 850 mPas.

Feed stream 1:

500 g of styrene 450 g of methyl methacrylate 150 g of 2-hydroxyethyl acrylate

Feed stream 2:

80 g of deionized water 10 g of sodium peroxodisulfate

EXAMPLE 4

A 4 l glass vessel with anchor stirrer (120 rpm) was charged with 217 g of a 46% strength by weight aqueous solution of a sodium styrenesulfonate homopolymer (pH 4.7; K value 12.0), 100 g of Lipamin OK and 479 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85C, the remainder of feed stream 1 was supplied continuously over the course of 4 h and the remainder of feed stream 2 was supplied continuously over the course of 4.5 h, the two feed streams being kept spatially separate. The polymer prepared in this way contains 28.3% of nonvolatile fractions and has a pH of 3.6. The viscosity of the resulting composition is 272 mPas.

Feed stream 1:

60 g of styrene 60 g of methyl methacrylate 80 g of ethylhexyl acrylate

Feed stream 2:

60 g of deionized water 2 g of sodium peroxodisulfate

EXAMPLE 5

A 4 l glass vessel with anchor stirrer (120 rpm) was charged with 270 g of Luviquat FC 905 (BASF, 40% strength by weight aqueous solution of a quaternized vinylimidazole-vinylpyrrolidone copolymer, pH 6.0; K value 14.8), 87 g of Emulphor NPS 25 (BASF, 15% strength by weight aqueous solution of a nonylphenol ethoxylate, average degree of ethoxylation=25) and 200 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 4 h and the remainder of feed stream 2 was supplied continuously over the course of 4.5 h, the two feed streams being kept spatially separate. The polymer prepared in this way contains 29.7% of nonvolatile fractions and has a pH of 3.2. The viscosity of the resulting composition is 32 mPas.

Feed stream 1:

108 g of methyl methacrylate 72 g of 2-ethylhexyl acrylate 172 g of deionized water 18 g of Lutensol AT 18 (BASF, 20% strength by weight aqueous solution of a fatty alcohol ethoxylate, average degree of ethoxylation=18)

Feed stream 2:

60 g of deionized water 1.8 g of sodium peroxodisulfate

EXAMPLE 6

A 4 l glass vessel with anchor stirrer (120 rpm) was charged with 429 g of Sokalan PA 80 S (35% strength by weight aqueous solution of an acrylic acid homopolymer, pH about 1.8; average molar mass Mw=100 kg/mol), 25 g of Noramox C 11 (Elf-Atochem, ethoxylated coconut fatty amine, average degree of ethoxylation=11) and 208 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 3 h and the remainder of feed stream 2 was supplied continuously over the course of 3.5 h, the two feed streams being kept spatially separate. The polymer prepared in this way contains 36.9% of nonvolatile fractions and has a pH of 2.1. The viscosity of the resulting composition is 398 mPas.

Feed stream 1:

125 g of methyl methacrylate 125 g of n-butyl acrylate 2.5 g of methacrylic acid Feed stream 2:

100 g of deionized water 2.5 g of sodium peroxodisulfate

EXAMPLE 7

A 4 l glass vessel with anchor stirrer (120 rpm) was charged with 270 g of Sokalan HP 80 (BASF, 35% strength by weight aqueous solution of an acrylic acid-methylpolyglycol methacrylate copolymer, pH 7.2; K value 26), 80 g of Lipamin OK and 321 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C, the remainder of feed stream 1 was supplied continuously over the course of 4 h and the remainder of feed stream 2 was supplied continuously over the course of 4.5 h, the two feed streams being kept spatially separate. The polymer prepared in this way contains 29.0% of nonvolatile fractions and has a pH of 6.4. The viscosity of the resulting composition is 28 mpas.

Feed stream 1:

32 g of styrene 128 g of n-butyl acrylate 72 g of 2-hydroxyethyl acrylate

Feed stream 2:

80 g of deionized water 1.6 g of Wako V 50 (Wako, azo free-radical initiator

EXAMPLE 8

4 l glass vessel with anchor stirrer (120 rpm) was charged with 240 g of Sokalan CP 12 S, 87 g of cetyltrimethylammonium bromide and 560 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 3 h and the remainder of feed stream 2 was supplied continuously over the course of 3.5 h, the two feed streams being kept spatially separate. The polymer prepared in this way contains 28.6% of nonvolatile fractions and as a pH of 1.5. The viscosity of the resulting composition is 7 mpas.

Feed stream 1:
100 g of styrene
90 g of methyl methacrylate
10 g of 2-hydroxyethyl acrylate
Feed stream 2:
60 g of deionized water
2 g of sodium peroxodisulfate

Comparative Example C-1

A 4 l glass vessel with anchor stirrer (120 rpm) was charged with 270 g of Sokalan CP 12 S, 250 g of Disponil FES 77 and 875 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 3 h and the remainder of feed stream 2 was supplied continuously over the course of 3.5 h, the two feed streams being kept spatially separate. The polymer prepared in this way contains 35.2% of nonvolatile fractions and has a pH of 1.9. The viscosity of the resulting composition is 18 mpas.

Feed stream 1:
250 g of styrene
225 g of methyl methacrylate
25 g of 2-hydroxyethyl acrylate
Feed stream 2:
200 g of deionized water
5 g of sodium peroxodisulfate

Comparative Example C-2

A 4 l glass vessel with anchor stirrer (120 rpm) was charged with 240 g of a 32% strength by weight aqueous solution of a dimethylaminoethyl acrylate homopolymer (permanently quaternized with dimethyl sulfate; pH 4.0; K value 10.8), 100 g of Lipamin OK and 1200 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 4 h and the remainder of feed stream 2 was supplied continuously over the course of 4.5 h, the two feed streams being kept spatially separate. The polymer prepared in this way contains 23.5% of nonvolatile fractions and has a pH of 4.2. The viscosity of the resulting composition is 80 mPas.

Feed stream 1:
280 g of n-butyl acrylate
100 g of methyl methacrylate
20 g of acrylonitrile
20 g of Lipamin OK
131 g of deionized water
Feed stream 2:
100 g of deionized water
4 g of sodium peroxodisulfate

Comparative Example C-3

A 4 l glass vessel with anchor stirrer (120 rpm) was charged with 183 g of Disponil FES 77 and 900 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 4 h and the remainder of feed stream 2 was supplied continuously over the course of 4.5 h, the two feed streams being kept spatially separate. After cooling, 330 g of a 32% strength by weight aqueous solution of a dimethylaminoethyl acrylate homopolymer (permanently quaternized with dimethyl sulfate; pH 4.0; K value 10.8) were added. The polymer prepared in this way contains 39.5% of nonvolatile fractions and has a pH of 3.9. The polymer dispersion was unstable, and gradual sedimentation was observed.

Feed stream 1:
385 g of n-butyl acrylate
138 g of methyl methacrylate
28 g of acrylonitrile
37 g of Disponil FES 77
167 g of deionized water
Feed stream 2:
100 g of deionized water
5.5 g of sodium peroxodisulfate

Comparative Example C-4

A 4 l glass vessel with anchor stirrer (120 rpm) was charged with 83 g of Lipamin OK and 602 g of deionized water. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 3 h and the remainder of feed stream 2 was supplied continuously over the course of 3.5 h, the two feed streams being kept spatially separate. After cooling, 264 g of Sokalan HP 80 were added. The polymer prepared in this way contains 26.0% of nonvolatile fractions and has a pH of 7.4. The viscosity of the resulting composition is 15 mPas.

Feed stream 1:
110 g of styrene
110 g of n-butyl acrylate
11 g of 2-hydroxyethyl acrylate
Feed stream 2:
60 g of deionized water
2.2 g of sodium peroxodisulfate

Comparative Example C-5

A 4 l glass vessel with anchor stirrer (120 rpm) was charged with 300 g of Luviquat FC 905 (BASF, 40% strength by weight aqueous solution of a quaternized vinylimidazole-vinylpyrrolidone copolymer, pH 6.0; K value 14.8), 200 g of Steinapol NLS (BASF, 15% strength by weight aqueous solution of sodium lauryl sulfate) and 303 g of deionized water. This was accompanied by the appearance of a marked cloudiness, which did not disappear again even when the temperature was raised. At an internal temperature of 85° C., 5% by weight of the total amount of a feed stream 1 and 10% by weight of the total amount of a feed stream 2 were added. The reaction mixture was initially polymerized at 85° C. for 10 minutes. Thereafter, at 85° C., the remainder of feed stream 1 was supplied continuously over the course of 4 h and the remainder of feed stream 2 was supplied continuously over the course of 4.5 h, the two feed streams being kept spatially separate. This gave a latex having a high proportion of coagulum, which could neither be filtered nor processed further.

Feed stream 1:

120 g of methyl methacrylate 80 g of 2-ethylhexyl acrylate 20 g of Lutensol AT 18 (BASF, 20% strength by weight aqueous solution of a fatty alcohol ethoxylate, average degree of ethoxylation=18)

Feed stream 2:

100 g of deionized water 2.0 g of sodium peroxodisulfate

Table 1 lists the stability of the dispersions obtained in accordance with the above Examples. The test for dilutability was carried out by adding the respective sample dropwise to about 50 g of deionized water at 23° C. with stirring. If a precipitate or the formation of gel specks occurred when this was done, the sample is classed as unstable to dilution with water. The shear stability was tested by shearing the undiluted samples at 10,000 rpm for 10 minutes using a Dispermat. The sample was then coated onto a glass slide and examined for coagulum and/or gel specks (fine coagulum). If there is a marked increase in coagulum and/or gel specks in comparison to the sample which has not undergone shearing, the sample is classed as unstable to shear. The test for electrolyte stability takes place by adding the respective sample dropwise to about 50 g of aqueous $CaCl_2$ solution of defined concentration with stirring at 23° C. If coagulation occurs in this case, the electrolyte stability of the sample has been exceeded. Table 1 indicates the $CaCl_2$ concentration at which the respective sample is still stable.

The results obtained in Table 1 make it clear that the combination of a polyelectrolyte with an oppositely charged surfactant as protective colloid system in emulsion polymerization gives latices which have high electrolyte stability and, in particular, high shear stability but which can be flocculated by dilution with water. The combination of same-charge polyelectrolytes and surfactants, on the other hand, leads to polymer dispersions which are stable on dilution with water. The subsequent addition of a polyelectrolyte to a polymer dispersion stabilized with a surfactant whose charge is opposite to that of the polyelectrolyte leads to a stability behavior which is different from that with the simultaneous presence of both components during the emulsion polymerization. In general, the latex flocculates. A comparison of Example 5 with Comparative Example C-5 makes it clear that the use of ethoxylated surfactants greatly increases, in general, the stability of compositions of the invention.

TABLE 1

Stability of the patent examples on dilution, shear and addition of electrolyte

| Sample | Polarity of Polyelectrolyte | Polarity of Surfactant | SC [%] | Coag. [%] | Stability on Dilution | Stability on Shear | Stability on Addition of electrolyte |
|---|---|---|---|---|---|---|---|
| Ex. 1 | neg. | pos. | 39.2 | <0.01 | unstable | stable | to 10% |
| Ex. 2 | pos. | neg. | 37.5 | 0.02 | unstable | stable | to 5% |
| Ex. 3 | neg. | pos. | 63.7 | 0.11 | unstable | stable | to 1% |
| Ex. 4 | neg. | pos. | 28.3 | 0.02 | unstable | stable | to 5% |
| Ex. 5 | pos. | neg. | 29.7 | 0.08 | unstable | stable | to 25% |
| Ex. 6 | neg. | pos. | 36.9 | 0.07 | unstable | stable | to 5% |
| Ex. 7 | neg. | pos. | 29.0 | <0.01 | unstable | stable | to 25% |
| Ex. 8 | neg. | pos. | 28.6 | 2.00 | unstable | stable | to 5% |
| Comp. C-1 | neg. | neg. | 35.2 | 0.02 | stable | unstable | to 10% |
| Comp. C-2 | pos. | pos. | 23.5 | <0.01 | stable | unstable | to 1% |
| Comp. C-3 | pos.* | neg. | Latex unstable; polymer forms sediment | | | | |
| Comp. C-4 | neg.* | pos. | 26.0 | 1.53 | limited | unstable | to 5% |
| Comp. C-5 | pos. | neg. | Latex unstable; high coagulum content | | | | |

*metered in subsequently

A further characteristic of the composition of the invention is that hardness and strength of the film obtained after drying can be increased by subsequent thermal conditioning at temperatures above 80° C., preferably above 120° C., in general. This increase in hardness can be registered, for example, by measuring the König pendulum hardness in accordance with DIN 53157. To demonstrate this effect, films with a thickness of about 100 mm on glass slides were produced from the samples of the Patent Examples 1, 4 and 8 by drying at 23° C. for a number of days. The pendulum hardness of these films was determined in their unconditioned form and after thermal conditioning for 10 minutes at 100° C. and 160° C. This was done using a pendulum hardness measuring apparatus from Byk Mallinckrodt GmbH. The results obtained, which are set out in Table 2, make it clear that even ten minutes of thermal conditioning at 100° C., and in particular at 160° C., result in a significant increase in the pendulum hardness, i.e., in the hardness of the film.

TABLE 2

Pendulum hardness (in pendulum seconds) of the films before and after thermal conditioning

| | unconditioned | 10 min at 100° C. | 10 min at 160° C. |
|---|---|---|---|
| Example 1 | 52 | 128 | 188 |
| Example 4 | 27 | 91 | 126 |
| Example 8 | 105 | 234 | 214 |

We claim:

1. A polymer dispersion comprising
   i) polymer particles dispersed in an aqueous medium and composed of units of ethylenically unsaturated monomers,
   ii) a water-soluble polymeric polyelectrolyte which along a polymeric backbone carries a large number of ionic groups of uniform charge character or groups which can be ionized to such groups, and
   iii) 2.5 to 15% by weight, based on the total weight of the polymer dispersion, of an ionic surfactant which carries an ionic group having a charge character opposite to that of the polymeric polyelectrolyte, or a group which can be ionized to such a group.

2. A polymer dispersion as claimed in claim 1, wherein the polyelectrolyte and the ionic surfactant are in a weight ratio, based on solids, of from 20:1 to 1:1.

3. polymer dispersion as claimed in claim 1, which additionally comprises a nonionic surfactant.

4. A polymer dispersion as claimed in claim 1, wherein the polyelectrolyte is composed of units of ethylenically unsaturated monomers and 20–100% by weight, based on the total monomer units, of ethylenically unsaturated $C_3$–$C_8$ monocarboxylic acids; $C_4$–$C_8$ dicarboxylic acids or their monoesters; sulfonic acids; sulfuric monoesters or phosphonic acids and/or salts thereof, and the ionic surfactant is a quaternary ammonium salt having at least one hydrocarbon chain of at least 6 carbon atoms.

5. A polymer dispersion as claimed in claim 1, wherein the polyelectrolyte is composed of units of ethylenically unsaturated monomers and 20–100% by weight, based on the total monomer units, of ethylenically unsaturated sulfonic acids, sulfuric monoesters or phosphonic acids and/or salts thereof and the ionic surfactant is an amine having at least one hydrocarbon chain of at least 6 carbon atoms, or a protonated form thereof.

6. A polymer dispersion as claimed in claim 1, wherein the polymeric polyelectrolyte is a cationic polymeric polyelectrolyte, which is composed of units of ethylenically unsaturated monomers and 20–100% by weight, based on the total monomer units, of units of monoethylenically unsaturated monomers which carry a quaternary ammonium group or a protonizable amino group and the ionic surfactant is an anionic surfactant which is selected from the group consisting of alkyl sulfates, sulfuric monoesters with ethoxylated alkyl alcohols, sulfuric monoesters with ethoxylated $C_4$–$C_9$ alkylphenols, alkylsulfonates, alkenylsulfonates, alkylarylsulfonates, alkylglyceryl ether sulfonates, alkyl phosphates, dialkyl phosphates, alkylaryl phosphates, alkylphosphonates, alkenylphosphonates, alkylarylphosphonates, monoalkyl esters of sulfosuccinic acid, dialkyl esters of sulfosuccinic acid, singly ring-sulfonated monoalkylbiphenyl ethers, multiply ring-sulfonated monoalkylbiphenyl ethers, methylcarboxylates of ethoxylated alkyl alcohols, and $C_6$–$C_{22}$ carboxylic acids.

7. A polymer dispersion as claimed in claim 1, wherein the polyelectrolyte has a degree of polymerization of less than 2000.

8. A polymer dispersion as claimed in claim 1, wherein the polymer particles contain in copolymerized form:
60–100% by weight, based on the total monomer units, of $C_1$–$C_{12}$ alkyl (meth)acrylates, vinylaromatic compounds, or vinyl esters of $C_2$–$C_{12}$ monocarboxylic acids, and
0–40% by weight of (meth)acrylic acid, (meth)acrylonitrile, $C_2$–$C_8$ hydroxy (meth)acrylate, (meth)acrylamide, or glycidyl (meth)acrylate.

9. A polymer dispersion as claimed in claim 1, wherein the polyelectrolyte and the polymer particles are in a weight ratio, based on solids, of from 5:1 to 1:10.

10. A process for preparing a polymer dispersion as claimed in claim 1, which comprises free-radically polymerizing at least one ethylenically unsaturated monomer in an aqueous medium in the presence of a combination of a water-soluble polymeric polyelectrolyte which along a polymeric backbone carries a large number of ionic groups of uniform charge character or groups which can be ionized to such groups, and an ionic surfactant which carries an ionic group having a charge character opposite to that of the polymeric polyelectrolyte, or a group which can be ionized to such a group.

11. A method of producing two- or three-dimensional structures, which comprises contacting a particulate or fibriform substrate with a polymer dispersion as claimed in claim 1 and subjecting the substrate so treated to a curing step.

12. A method of producing two- or three-dimensional structures, which comprises contacting a polymer dispersion as claimed in claim 1, a particulate or fibriform substrate and an aqueous phase with one another, in the course of which the polymer particles become coagulated, removing any excess aqueous phase, and subjecting the mixture of substrate and coagulated polymer particles to a curing step.

13. A polymer dispersion as claimed in claim 6, wherein the ionic surfactant is selected from the group consisting of ethoxylated alkyl sulfates, ethoxylated alkylsulfonates, ethoxylated alkylaryl sulfates, and ethoxylated alkylarylsulfonates.

14. A polymer dispersion comprising
i) polymer particles dispersed in an aqueous medium and composed of units of ethylenically unsaturated monomers,
ii) a water-soluble polymeric polyelectrolyte which along a polymeric backbone carries a large number of ionic groups of uniform charge character or groups which can be ionized to such groups, and
iii) an ionic surfactant which carries an ionic group having a charge character opposite to that of the polymeric polyelectrolyte, or a group which can be ionized to such a group,
wherein the polyelectrolyte is selected from the group consisting of
a) a polyelectrolyte composed of units of ethylenically unsaturated monomers and 20–100% by weight, based on the total monomer units, of units of ethylenically unsaturated $C_3$–$C_8$ monocarboxylic acids; $C_4$–$C_8$ dicarboxylic acids or their monoesters; sulfonic acids; sulfuric monoesters or phosphonic acids and/or salts thereof, and the ionic surfactant is a quaternary ammonium salt having at least one hydrocarbon chain of at least 6 carbon atoms;
b) a polyelectrolyte composed of units of ethylenically unsaturated monomers and 20–100% by weight, based on the total monomer units, of units of ethylenically unsaturated sulfonic acids, sulfuric monoesters or phosphonic acids and/or salts thereof and the ionic surfactant is an amine having at least one hydrocarbon chain of at least 6 carbon atoms, or a protonated form thereof; and
c) a cationic polymeric polyelectrolyte composed of units of ethylenically unsaturated monomers and 20–100% by weight, based on the total monomer units, of units of monoethylenically unsaturated monomers which carry a quaternary ammonium group or a protonizable amino group and the ionic surfactant is an anionic surfactant which is selected from the group consisting of alkyl sulfates, sulfuric monoesters with ethoxylated alkyl alcohols, sulfuric monoesters with ethoxylated $C_4$–$C_9$ alkylphenols, alkylsulfonates, alkenylsulfonates, alkylarylsulfonates, alkylglyceryl ether sulfonates, alkyl phosphates, dialkyl phosphates, alkylaryl phosphates, alkylphosphonates, alkenylphosphonates, alkylarylphosphonates, monoalkyl esters of sulfosuccinic acid, dialkyl esters of sulfosuccinic acid, singly ring-sulfonated monoalkylbiphenyl ethers, multiply ring-sulfonated monoalkylbiphenyl ethers, methylcarboxylates of ethoxylated alkyl alcohols, and $C_6$–$C_{22}$ carboxylic acids.

15. A polymer dispersion as claimed in claim 14, wherein the polyelectrolyte and the ionic surfactant are in a weight ratio, based on solids, of from 20:1 to 1:1.

16. Polymer dispersion as claimed in claim 14, which additionally comprises a nonionic surfactant.

17. A polymer dispersion as claimed in claim 14, wherein the polyelectrolyte is composed of units of ethylenically unsaturated monomers and 20–100% by weight, based on the total monomer units, of units of ethylenically unsaturated $C_3$–$C_8$ monocarboxylic acids; $C_4$–$C_8$ dicarboxylic acids or their monoesters; sulfonic acids; sulfuric monoesters or phosphonic acids and/or salts thereof, and the ionic surfactant is a quaternary ammonium salt having at least one hydrocarbon chain of at least 6 carbon atoms.

18. A polymer dispersion as claimed in claim 14, wherein the polyelectrolyte is composed of units of ethylenically unsaturated monomers and 20–100% by weight, based on the total monomer units, of units of ethylenically unsaturated sulfonic acids, sulfuric monoesters or phosphonic acids and/or salts thereof and the ionic surfactant is an amine having at least one hydrocarbon chain of at least 6 carbon atoms, or a protonated form thereof.

19. A polymer dispersion as claimed in claim 14, wherein the polyelectrolyte is a cationic polymeric polyelectrolyte, which is composed of units of ethylenically unsaturated monomers and 20–100% by weight, based on the total monomer units, of units of monoethylenically unsaturated monomers which carry a quaternary ammonium group or a protonizable amino group and the ionic surfactant is an anionic surfactant which is selected from the group consisting of alkyl sulfates, sulfuric monoesters with ethoxylated alkyl alcohols, sulfuric monoesters with ethoxylated $C_4$–$C_9$ alkylphenols, alkylsulfonates, alkenylsulfonates, alkylarylsulfonates, alkylglyceryl ether sulfonates, alkyl phosphates, dialkyl phosphates, alkylaryl phosphates, alkylphosphonates, alkenylphosphonates, alkylarylphosphonates, monoalkyl esters of sulfosuccinic acid, dialkyl esters of sulfosuccinic acid, singly ring-sulfonated monoalkylbiphenyl ethers, multiply ring-sulfonated monoalkylbiphenyl ethers, methylcarboxylates of ethoxylated alkyl alcohols, and $C_6$–$C_{22}$ carboxylic acids.

20. A polymer dispersion as claimed in claim 19, wherein the ionic surfactant is selected from the group consisting of ethoxylated alkyl sulfates, ethoxylated alkylsulfonates, ethoxylated alkylaryl sulfates, and ethoxylated alkylarylsulfonates.

21. A polymer dispersion as claimed in claim 14, wherein the polyelectrolyte has a degree of polymerization of less than 2000.

22. A polymer dispersion as claimed in claim 14, wherein the polymer particles contain in copolymerized form:

60–100% by weight, based on the total monomer units, of $C_1$–$C_{12}$ alkyl (meth)acrylates, vinylaromatic compounds, or vinyl esters of $C_2$–$C_{12}$ monocarboxylic acids, and 0–40% by weight of (meth)acrylic acid, (meth)acrylonitrile, $C_2$–$C_8$ hydroxy (meth)acrylate, (meth)acrylamide, or glycidyl (meth)acrylate.

23. A polymer dispersion as claimed in claim 14, wherein the polyelectrolyte and the polymer particles are in a weight ratio, based on solids, of from 5:1 to 1:10.

24. A process for preparing a polymer dispersion as claimed in claim 14, which comprises free-radically polymerizing at least one ethylenically unsaturated monomer in an aqueous medium in the presence of a combination of a water-soluble polymeric polyelectrolyte which along a polymeric backbone carries a large number of ionic groups of uniform charge character or groups which can be ionized to such groups, and an ionic surfactant which carries an ionic group having a charge character opposite to that of the polymeric polyelectrolyte, or a group which can be ionized to such a group.

25. A method of producing two- or three-dimensional structures, which comprises contacting a particulate or fibriform substrate with a polymer dispersion as claimed in claim 14 and subjecting the substrate so treated to a curing step.

26. A method of producing two- or three-dimensional structures, which comprises contacting a polymer dispersion as claimed in claim 14, a particulate or fibriform substrate and an aqueous phase with one another, in the course of which the polymer particles become coagulated, removing any excess aqueous phase, and subjecting the mixture of substrate and coagulated polymer particles to a curing step.

* * * * *